(12) United States Patent
Lee et al.

(10) Patent No.: US 9,174,280 B2
(45) Date of Patent: Nov. 3, 2015

(54) MOLD, A DEVICE FOR PROCESSING THE SAME, AND A REPLICA MADE THEREFROM

(75) Inventors: Seoungho Lee, Cheongju-si (KR); Gillhyun No, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 1458 days.

(21) Appl. No.: 12/438,322

(22) PCT Filed: Jun. 14, 2007

(86) PCT No.: PCT/KR2007/002866
§ 371 (c)(1),
(2), (4) Date: Jun. 10, 2010

(87) PCT Pub. No.: WO2008/023882
PCT Pub. Date: Feb. 28, 2008

(65) Prior Publication Data
US 2010/0247865 A1    Sep. 30, 2010

(30) Foreign Application Priority Data

Aug. 23, 2006  (KR) .......................... 10-2006-0080071

(51) Int. Cl.
*B23B 27/00* (2006.01)
*B23B 29/12* (2006.01)
(Continued)

(52) U.S. Cl.
CPC ................. *B23B 29/125* (2013.01); *B23B 5/48* (2013.01); *G02B 5/0231* (2013.01);
(Continued)

(58) Field of Classification Search
CPC .............. B32B 3/00; B28B 7/28; B23B 3/00; B23B 5/48; B23B 29/125; B23B 2226/31; G02B 5/0231; G02B 5/0278; G02B 5/045; G02B 5/0268; G02B 6/0065; G02B 6/0053

USPC ............................. 428/156; 249/175; 82/134
See application file for complete search history.

(56) References Cited

U.S. PATENT DOCUMENTS 4,734,339 A * 3/1988 Schachner et al. ............ 428/701
2003/0028287 A1 * 2/2003 Puskas .......................... 700/266
(Continued)

FOREIGN PATENT DOCUMENTS

JP    05-023901    2/1993
JP    2002-236204    8/2002
(Continued)

OTHER PUBLICATIONS

Machine translation of KR1019980072253.*
(Continued)

*Primary Examiner* — Maria Veronica Ewald
*Assistant Examiner* — Brian Handville
(74) *Attorney, Agent, or Firm* — KED & Associates LLP

(57) ABSTRACT

The present invention is directed to a mold. The present invention is also directed to a device for processing the same, and a replica made therefrom. A device for processing the mold comprises a cutting unit carving a surface of the mold; a housing accommodating the cutting unit and having an aperture through which a portion of the cutting unit protrudes; at least one piezo-electric element disposed between the cutting unit and the housing; and a signal generator applying an electrical signal to the piezoelectric element. The mold comprises a plurality of linear peaks and grooves that are formed on a surface of the mold, wherein both or one of the peaks and grooves have random or periodic meandering-shape. A replica manufactured by the mold comprises a plurality of linear crests and valleys that are formed on a surface of the replica, wherein both or one of the crests and valleys have random or periodic meandering-shape.

8 Claims, 9 Drawing Sheets

(51) Int. Cl.
  *B23B 5/48* (2006.01)
  *G02B 5/02* (2006.01)
  *G02B 5/04* (2006.01)
  *F21V 8/00* (2006.01)

(52) U.S. Cl.
  CPC .......... *G02B 5/0268* (2013.01); *G02B 5/0278* (2013.01); *G02B 5/045* (2013.01); *B23B 2226/31* (2013.01); *G02B 6/0053* (2013.01); *G02B 6/0065* (2013.01); *Y10T 82/2535* (2015.01); *Y10T 428/24479* (2015.01)

(56) References Cited

U.S. PATENT DOCUMENTS

2004/0190102 A1* 9/2004 Mullen et al. ................. 359/237
2007/0229232 A1* 10/2007 Hall et al. ................ 340/384.73

FOREIGN PATENT DOCUMENTS

| | | |
|---|---|---|
| JP | 2003-051262 | 2/2003 |
| JP | 2003-167107 | 6/2003 |
| KR | 10-1995-0023471 A | 8/1995 |
| KR | 1998-0008446 | 4/1998 |
| KR | 20-1998-038086 U | 9/1998 |
| KR | 10-1998-0072253 | 11/1998 |
| KR | 1998-072253 | 11/1998 |
| KR | 10-2006-0013548 | 2/2006 |
| KR | 10-2007-0053218 A | 5/2007 |

OTHER PUBLICATIONS

Aronov, et al. The Great Soviet Encyclopedia. 1979. 3rd Edition.*
Korean Office Action dated Nov. 21, 2007.
International Search Report dated Sep. 11, 2007.
Taiwanese Office Action dated Aug. 11, 2009.

* cited by examiner

MOLD, A DEVICE FOR PROCESSING THE SAME, AND A REPLICA MADE THEREFROM

CROSS-REFERENCE TO A RELATED APPLICATION

The present application claims the benefit of priority under 35 U.S.C. 119 based on the Korean patent application number 10-2006-0080071 filed on Aug. 23, 2006. This application is incorporated herein by reference in its entirety.

BACKGROUND

1. Field of the Invention

The present invention is directed to a mold. The present invention is also (Erected to a device for processing the same, and a replica made therefrom.

2. Background

Liquid crystal display known as LCD is an electronic device that changes electrical signals to visual signals by using the change of transmittance of liquid crystals according to applied voltages.

Generally, liquid crystal display comprises a liquid crystal panel displaying an image corresponding to driving signal and data signal from outside, and a backlight unit disposed at a back side of the liquid crystal panel for illuminating the panel.

The backlight unit comprises light source, reflection sheet and optical film.

The light source generates a light having a certain wavelength.

The reflection sheet reflects a light generated from the light source to proceed toward the liquid crystal panel.

The optical film comprises diffusion sheet, prism sheet and protective sheet.

The light generated from the light source passes through the diffusion sheet. Here, the diffusion sheet scatters the incident light to prevent its partial concentration and make the brightness uniform.

The brightness of the light transmitted from the diffusion sheet rapidly decreases. So, the prism sheet is used to prevent the decrease of brightness.

FIG. 1 is a view illustrating a conventional method of processing a mold.

Referring to FIG. 1, a bite 100 to which diamond particles 100a are adhered is fixed to a table and, a mold 110 is disposed under the bite 100, and a surface of the mold 110 contacts with the bite 100.

And, the mold 110 rotates, and moves to a left direction, and processes the bite 100. Here, the bite 100 may move horizontally when the mold 110 rotates only.

Generally, the rotation speed and straight line movement speed of the bite 100 are constant. Therefore, the surface of the mold 110 is cut by certain amount, and a linear uniform surface 112 is obtained, as shown in FIG. 1.

FIG. 2 is a perspective view illustrating a prism sheet manufactured by using the mold of FIG. 1.

Referring to FIG. 2, the prism sheet 200 comprises a prism base 230, and an array of prisms 210 formed on the prism base 230. The prisms 210 include side surfaces composed of a first surface 212 and a second surface 214, and the shape of prisms 210 is approximately isoscelestriangle. Generally, the first surface 212 and the second surface 214 make a right angle, but may make other angles by selection.

A plurality of prisms 210 are disposed on the prism base 230, and peaks 216 and grooves 218 are formed in turn. The prism sheet 200 makes a light incident from the prism base 230 refract by passing it through the prisms 210. Accordingly, the incident light with low incident angle is focused to front side, whereby the brightness is enhanced within a valid angle of view.

However, these prisms 210 of the conventional prism sheet 200 refract the incident light toward one direction because their surfaces are flat. Therefore, the conventional prism sheet 200 has a disadvantage that it is not appropriate to refract the light in two dimensions.

BRIEF DESCRIPTION OF THE DRAWINGS

These and other features, aspects and advantages of the present invention will be better understood with regard to the following descriptions, appended claims, and accompanying drawings wherein:

DETAILED DESCRIPTION OF THE INVENTION

One object of the present invention is to provide a mold, a device for processing the same, and a replica made therefrom having patterns to refract a tight in two dimensions.

Another object of the present invention is to provide a mold, a device for processing the same, and a replica made therefrom whose defect is difficult to be detected visually.

Another object of the present invention is to provide a mold, a device for processing the same, and a replica made therefrom that can reduce or eliminate moiré phenomenon.

The scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
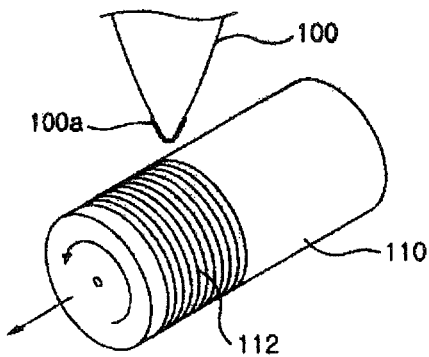
FIG. 1 is a view illustrating a conventional method of processing a mold.
Figure 2:
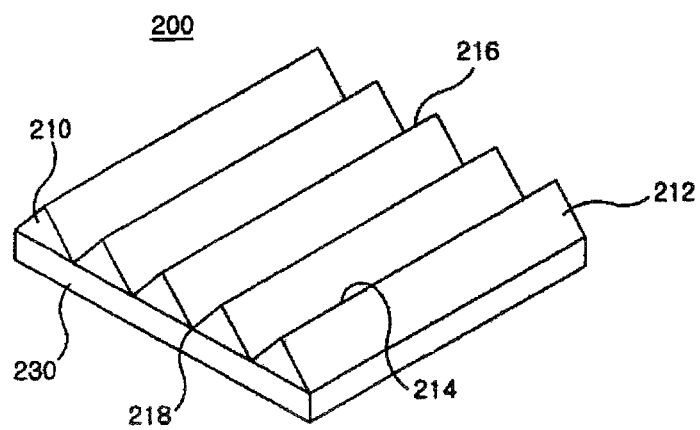
FIG. 2 is a perspective view illustrating a prism sheet manufactured by using the mold of FIG. 1.
Figure 3:
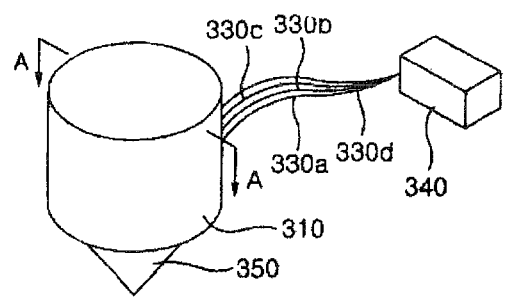
FIG. 3 is a perspective view illustrating a device for processing the mold according to one embodiment of the present invention.
Figure 4:
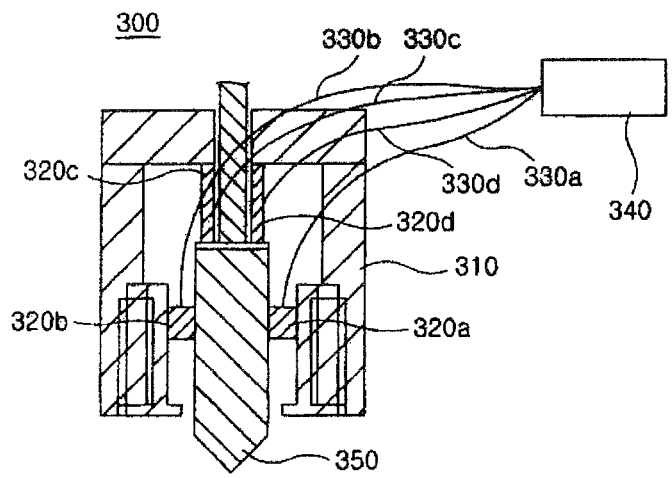
FIG. 4 is a cross-sectional view illustrating the device for processing the mold in FIG. 3 taken along the line A-A.

FIG. 3 is a perspective view illustrating a device for processing the mold according to one embodiment of the present invention and FIG. 4 is a cross-sectional view illustrating the device for processing the mold in FIG. 3 taken along the line A-A.

Referring to FIGS. 3 and 4, the processing device 300 of the present invention comprises housing 310, at least one piezoelectric element 320a, 320b, 320c, and 320d, signal generator 340, and cutting unit 350.

The housing 310 accommodates the cutting unit 350, and has an aperture 312 through which a portion of the cutting unit 350 protrudes. The shape of the housing 310 shown in FIGS. 3 and 4 may be changed to one which can fix to a processing table (not shown).

At least one piezoelectric element 320a, 320b, 320c, and 320d is disposed between the cutting unit 350 and the housing 310.

When a voltage is applied to the piezoelectric element 320a, 320b, 320c, and 320d, a mechanical displacement occurs to the piezoelectric element. On the contrary, when a stress or vibration is applied to the piezoelectric element 320a, 320b, 320c, and 320d, an electrical signal is generated therefrom.

According to one embodiment of the present invention, the piezoelectric element 320a and 320b disposed in a side wall of the housing 310 produces a mechanical displacement horizontally when the electrical signal is applied thereto.

Also, the piezoelectric element 320c and 320d disposed in an upper wall of the housing 310 produces a mechanical displacement vertically when the electrical signal is applied thereto. Here, the mechanical displacement in the vertical direction may be in the range of about 1 μm to 4 μm. Therefore, the cutting unit 350 of the processing device 300 of the present invention may have certain displacement vertically and horizontally, and a random displacement may occur by combination of mechanical displacement of each piezoelectric element 320a, 320b, 320c, and 320d.

The processing device 300 shown in FIG. 4 have four piezoelectric elements 320a, 320b, 320c, and 320d in the housing 310, but is not kited to such constitution. For example, one piezoelectric element may be disposed in the housing 310, and more piezoelectric elements may be disposed to control the displacement of the cutting unit 350 more precisely.

The piezoelectric element 320a, 320b, 320c and 320d includes at least one selected from the group consisting of rochelle salts, barium titanate and PZT.

According to one embodiment of the present invention, the piezoelectric elements 320a, 320b, 320c and 320d each have different piezo-electric modulus. Accordingly, the mechanical displacement of each piezoelectric element 320a, 320b, 320c, and 320d may be different even though same electrical signal is applied to each piezoelectric element 320a, 320b, 320c, and 320d.

The signal generator 340 applies an electrical signal to the piezoelectric elements 320a, 320b, 320c and 320d, and induces the piezoelectric elements 320a, 320b, 320c and 320d to produce a mechanical displacement.

Connection lines 530a and 530b are intermediate lines which transfer the electrical signal generated from the signal generator 540 to the piezoelectric elements 520a and 520b.

The signal generator 340 may be a DC voltage generator, a variable AC voltage generator, or a function generator.

In case a voltage generated from the signal generator 340 is applied to the piezo-electric elements 320a, 320b, 320c and 320d, the piezoelectric elements 320a, 320b, 320c and 320d produce mechanical displacement corresponding to the voltage variable.

The cutting unit 350 carves a surface of the mold 600. The cutting unit 350 includes at least one material selected from the group consisting of carbon steel, high speed steel, hard metal and ceramics.

The cutting unit 350 is connected to the piezoelectric elements 320a, 320b, 320c and 320d, and so causes a displacement corresponding to a mechanical displacement of the piezoelectric element 320a, 320b, 320c and 320d.

Figure 5:
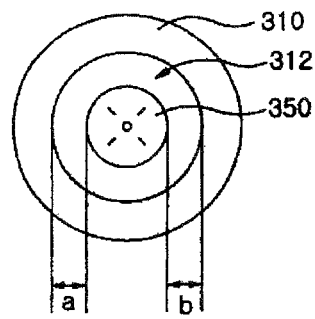
FIG. 5 is a bottom view illustrating the device for processing the mold in FIG. 3.

FIG. 5 is a bottom view illustrating a device for processing the mold in FIG. 3.

Referring to FIG. 5, the cutting unit 350 is spaced apart from the aperture of the housing 310 by a distance (a+b). Therefore, the cutting unit 350 accommodated in the hosing 310 may produce a displacement within the predetermined distance (a+b).

Accordingly, even though the piezoelectric elements 320a, 320b, 320c and 320d produce excessive displacement by malfunction of the signal generator 340, the cutting unit 350 produces a displacement within a predetermined distance.

According to one embodiment of the present invention, the distance (a+b) is in the range of about 1 μm to 4 μm.

Figure 6:
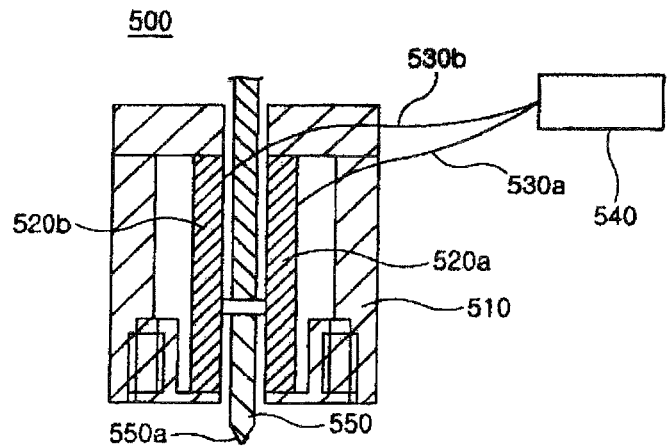
FIG. 6 is a cross-sectional view illustrating a device for processing the mold according to another embodiment of the present invention.

FIG. 6 is a cross-sectional view illustrating a device for processing the mold according to another embodiment of the present invention.

Referring to FIG. 6, two piezoelectric elements 520a and 520b are disposed between the cutting unit 550 and the housing 510.

According to one embodiment of the present invention, the piezoelectric elements 520a and 520b each have different piezo-electric modulus. Accordingly, the cutting unit 550 may produce a horizontal displacement as well as a vertical displacement.

For example, in case the vertical displacement of one piezoelectric element 520a is larger than that of other piezoelectric element 520b when same electrical signal is applied to the piezoelectric elements 520a and 520b, the cutting unit 550 produces a horizontal displacement as well as a vertical displacement.

In FIG. 6, diamond particles 550a may be adhered onto a portion of the cutting unit 550, contacting with the surface of the mold 600, whereby the cutting unit 550 may have enhanced durability and hardness.

Figure 7:
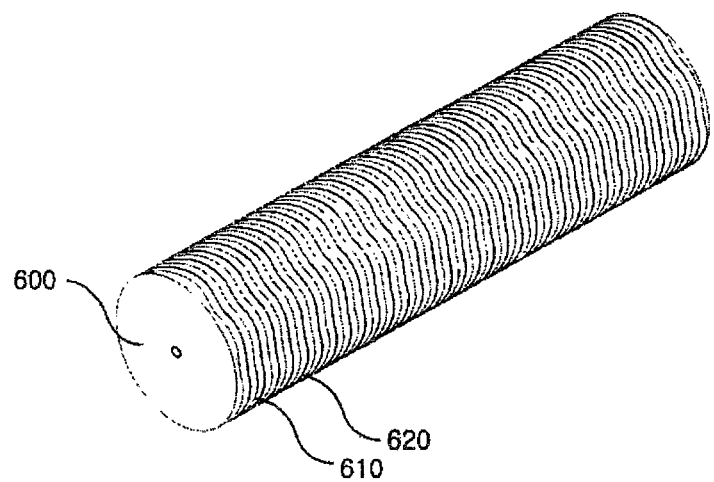
FIG. 7 is a perspective view illustrating the mold according to one embodiment of the present invention.

FIG. 7 is a perspective view illustrating the mold according to one embodiment of the present invention.

Referring to FIG. 7, the mold 600 of the present invention is processed by the processing device 300 and 500 as shown in FIGS. 4 and 6. And, the mold 600 comprises a plurality of linear peaks 620 and grooves 610 that are formed on a surface of the mold 600. Here, both or one of the peaks 620 and grooves 610 have random or periodic meandering-shape.

The depth of the peak 620 and the height of the groove 610 are determined by operation of the cutting unit 350 and 550, and so may change randomly or periodically, or may be constant.

Figure 8:
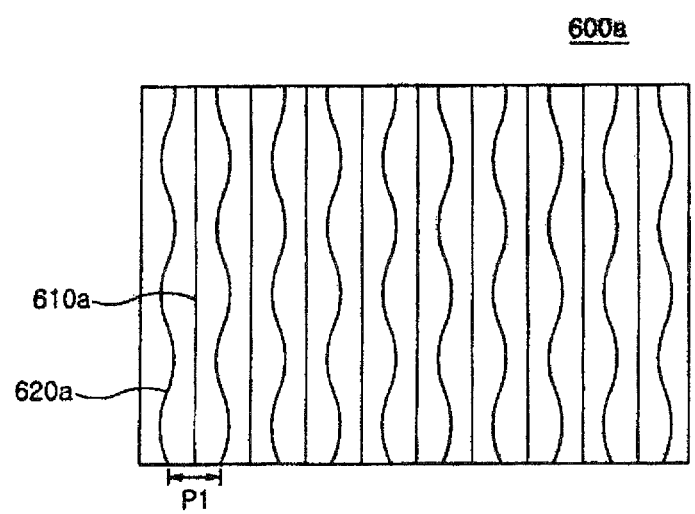
FIG. 8 is a plane view illustrating a mold according to one embodiment of the present invention.

FIG. 8 is a plane view illustrating the mold according to one embodiment of the present invention.

In case the processing device 300 and 500 vibrates periodically in the vertical direction, the mold 600a as shown in FIG. 8 is formed.

The processing device 300 and 500 does not produce a horizontal displacement, and so the groove 610a of the mold 600a is formed according to the straight direction. However, the depth of the groove 610a is changed.

The peaks 620a are formed symmetrically to the axis of groove 610a, and the distance P1 between peaks 620a changes periodically.

Figure 9:
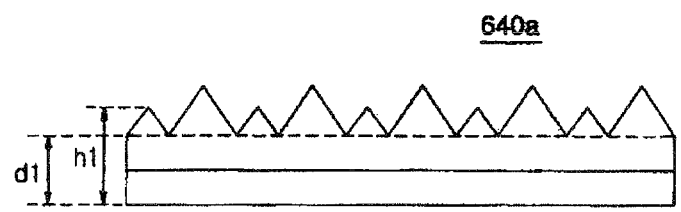
FIG. 9 is a front view illustrating a replica manufactured by the mold in FIG. 8.

FIG. 9 is a front view illustrating a replica manufactured by the mold in FIG. 8.

Figure 10:
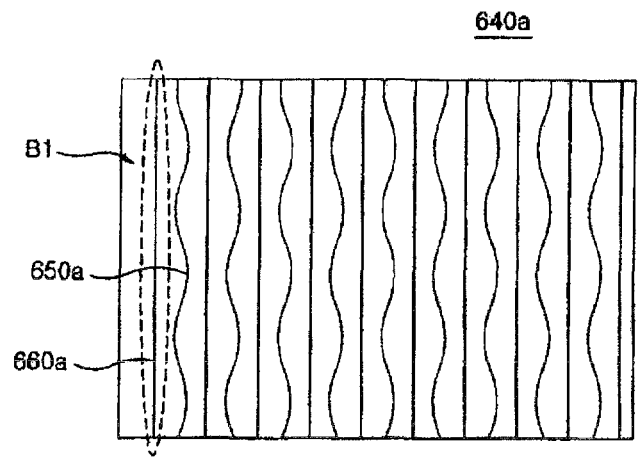
FIG. 10 is a plane view illustrating the replica in FIG. 9.
Figure 11:
FIG. 11 is a side view illustrating B1 part of FIG. 10.

FIG. 10 is a plane view illustrating the replica in FIG. 9; and FIG. 11 is a side view illustrating B1 part of FIG. 10.

Referring to FIGS. 9 to 11, a plurality of linear crests 660a and valleys 650a are formed on a surface of the replica 640a.

The crests 660a of the replica 640a correspond to the grooves 610a of the mold 600a, and the valleys 650a of the replica 640a correspond to the peaks 620a of the mold 600a.

The groove 610a of the mold 600a as shown in FIG. 8 is formed in the straight direction, and so the crest 660a of the replica 640a is also formed in the straight direction. And, the peaks 620a of the mold 600a are formed symmetrically to the axis of groove 610a, and so the valleys 650a of the replica 640a are also formed symmetrically to the axis of crest 660a.

In each line of prisms, the height (h1) of the replica 640a from bottom to crest 660a changes periodically, and the distance (d1) of the replica 640a from bottom to valleys 650a is constant.

Referring to FIG. 11, observing the crest 660a formed on one line of the replica 640a from the side, the height (L1) of the crest 660a changes periodically.

Figure 12:
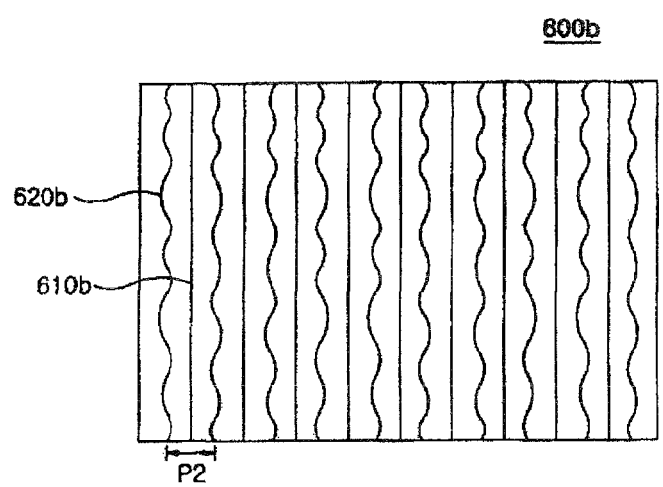
FIG. 12 is a plane view illustrating the mold according to another embodiment of the present invention.

FIG. 12 is a plane view illustrating the mold according to another embodiment of the present invention.

In case the processing device 300 and 500 vibrates randomly in the vertical direction, the mold 600b as shown in FIG. 12 is formed.

The processing device 300 and 500 does not produce a horizontal displacement, and so the groove 610b of the mold 600b is formed to the straight direction. However, the depth of the groove 610b changes randomly according to the vertical vibration of the processing device 300 and 500.

The height of the peak 620b changes randomly, and the distance (P2) between peaks 620b changes randomly.

Figure 13:
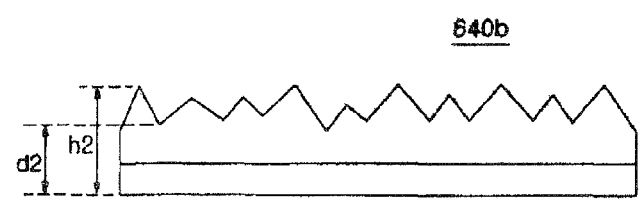
FIG. 13 is a front view illustrating a replica manufactured by the mold in FIG. 12.

FIG. 13 is a front view illustrating a replica manufactured by the mold in FIG. 12.

Figure 14:
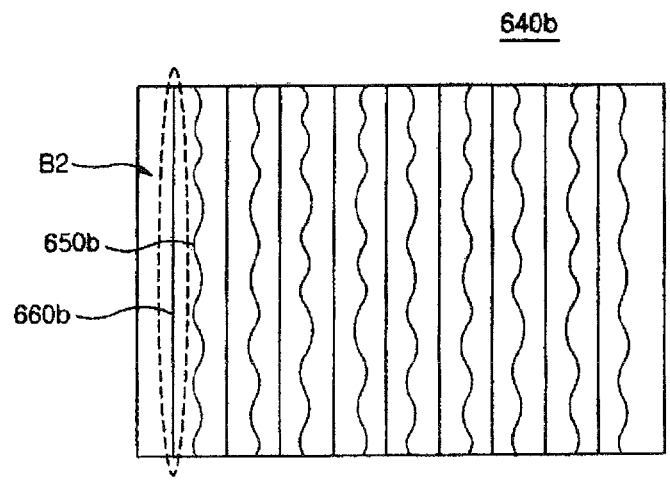
FIG. 14 is a plane view illustrating the replica in FIG. 13.
Figure 15:
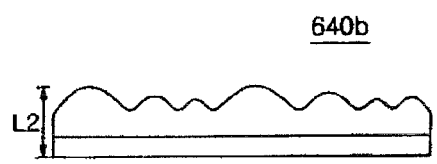
FIG. 15 is a side view illustrating B2 part of FIG. 14.

FIG. 14 is a plane view illustrating the replica in FIG. 13; and FIG. 15 is a side view illustrating B2 part of FIG. 14.

Referring to FIGS. 13 to 15, a plurality of linear crests 660b and valleys 650b are formed on a surface of the replica 640b.

The crests 660b of the replica 640b correspond to the grooves 610b of the mold 600b, and the valleys 650b of the replica 640b correspond to the peaks 620b of the mold 600b.

The groove 610b of the mold 600b as shown in FIG. 12 is formed in the straight direction, and so the crest 660b of the replica 640b is also formed in the straight direction. Also, the peaks 620b of the mold 600b have random meandering-shape, and so the valleys 650b of the replica 640b also have random meandering-shape.

In each line of prisms, the height (h2) of the replica 640b from bottom to crest 660b changes randomly, and the distance (d2) of the replica 640b from bottom to valleys 650b changes randomly.

Referring to FIG. 15, observing the crest 660b in one line of replica 640b from the side, the height (L2) of the crest 660b changes randomly.

Figure 16:
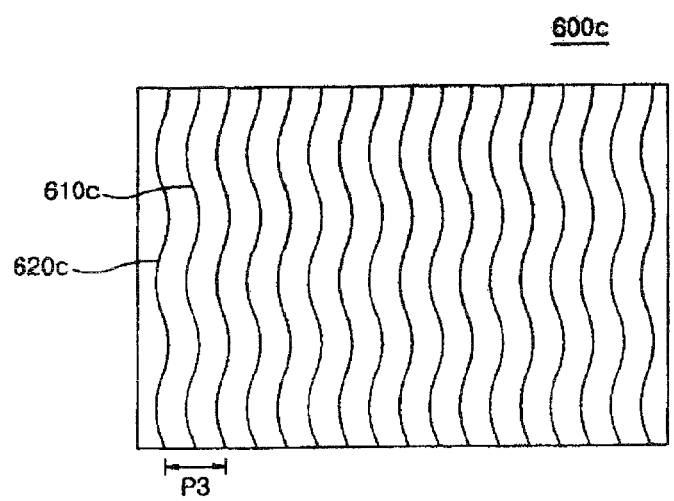
FIG. 16 is a plane view illustrating the mold according to another embodiment of the present invention.

FIG. 16 is a plane view illustrating the mold according to another embodiment of the present invention.

In case the processing device 300 and 500 vibrates periodically in the horizontal direction, the mold 600c as shown in FIG. 16 is formed.

The grooves 610c and peaks 620c of the mold 600c have periodic meandering-shape.

The processing device 300 and 500 does not produce a vertical displacement, and so the depth of grooves 610c and the height of peaks 620c are constant, and the distance (P3) between peaks 620c is constant.

Figure 17:
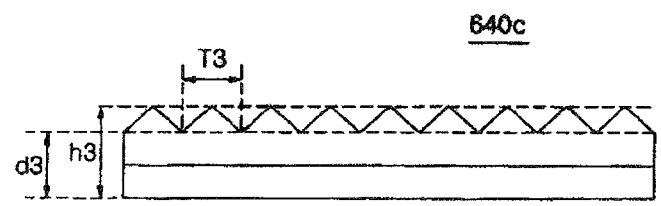
FIG. 17 is a front view illustrating a replica manufactured by the mold in FIG. 16.

FIG. 17 is a front view illustrating a replica manufactured by the mold in FIG. 16.

Figure 18:
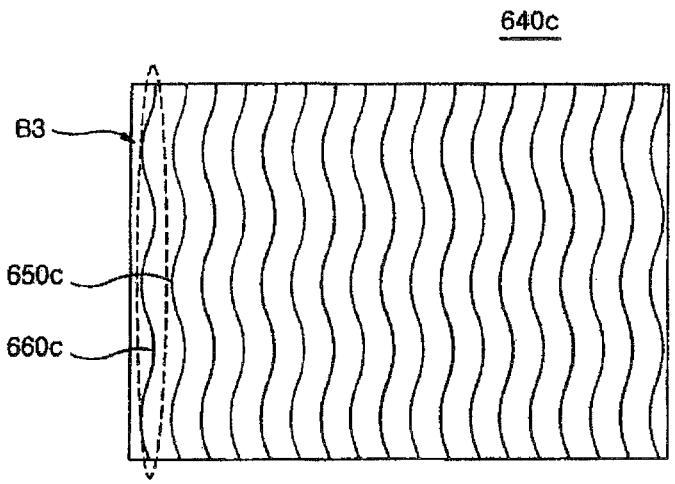
FIG. 18 is a plane view illustrating the replica in FIG. 17.
Figure 19:
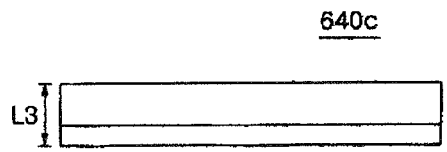
FIG. 19 is a side view illustrating B3 part of FIG. 18.

FIG. 18 is a plane view illustrating the replica in FIG. 17; and FIG. 19 is a side view illustrating B3 part of FIG. 18.

Referring to FIGS. 17 to 19, a plurality of linear crests 660c and valleys 650c are formed on a surface of the replica 640c.

The crests 660c of the replica 640c correspond to the grooves 610c of the mold 600c, and the valleys 650c of the replica 640c correspond to the peaks 620c of the mold 600c.

The grooves 610c and peaks 620c of the mold 600c have periodic meandering-shape as shown in FIG. 16, and so the crests 660c and valleys 650c of the replica 640c also have periodic meandering-shape.

In each line of prisms, the height (h3) of replica 640c from bottom to crest 660c is constant, and the distance (d3) of the replica 640c from bottom to valleys 650c is constant.

Also, the distance (P3) between peaks 620c of the mold 600c shown in FIG. 16 is constant, and so the distance (T3) between valleys 650c of the replica 640c is constant.

Referring to FIG. 19, observing the crest 660c in one line of replica 640c from the side, the height (L3) of the crest 660c is constant.

Figure 20:
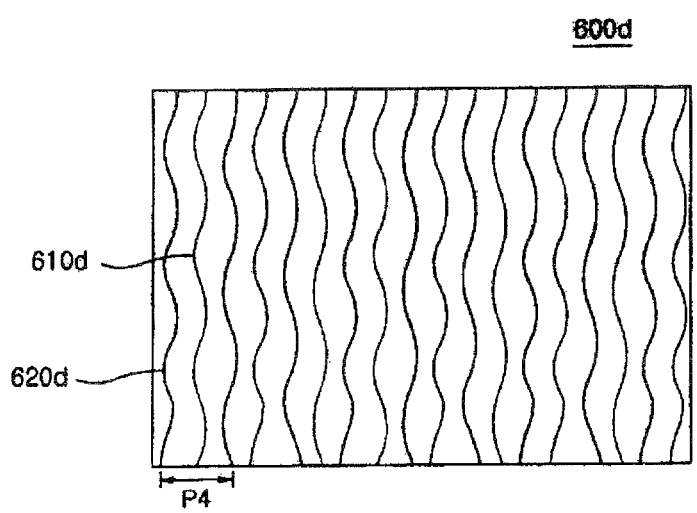
FIG. 20 is a plane view illustrating the mold according to another embodiment of the present invention.

FIG. 20 is a plane view illustrating the mold according to another embodiment of the present invention.

In case the processing device 300 and 500 vibrates randomly in the horizontal direction, the mold 600d as shown in FIG. 20 is formed.

The grooves 610d and peaks 620d of the mold 600d have random meandering-shape.

The processing device 300 and 500 does not produce a vertical displacement, and so the depth of grooves 620d is constant. However, the height of peaks 620d changes randomly. And, the distance (P4) between peaks 620d changes randomly.

Figure 21:
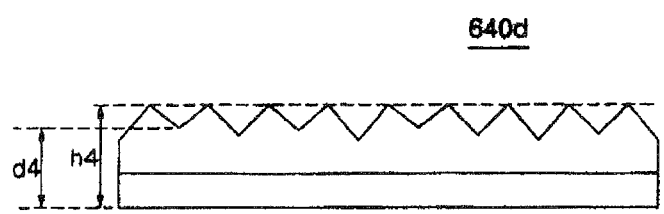
FIG. 21 is a front view illustrating a replica manufactured by the mold in FIG. 20.

FIG. 21 is a front view illustrating a replica manufactured by the mold in FIG. 20.

Figure 22:
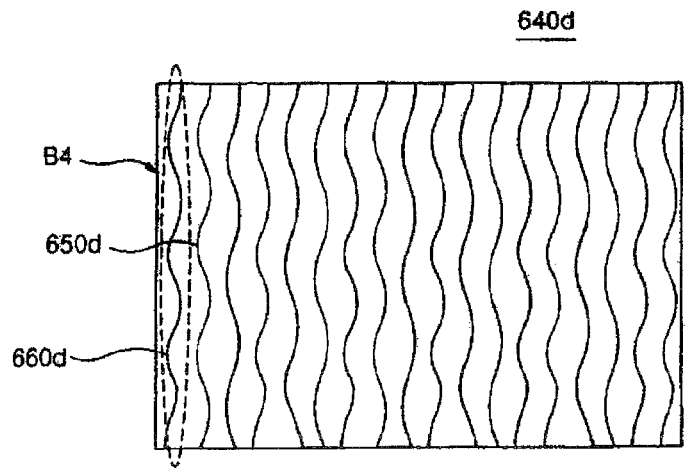
FIG. 22 is a plane view illustrating the replica in FIG. 21.
Figure 23:
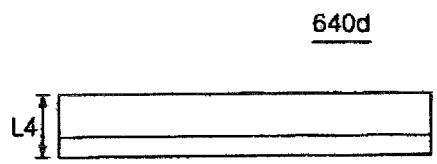
FIG. 23 is a side view illustrating B4 part of FIG. 22.

FIG. 22 is a plane view illustrating the replica in FIG. 21; and FIG. 23 is a side view illustrating B4 part of FIG. 22.

Referring to FIGS. 21 to 23, a plurality of linear crests 660d and valleys 650d are formed on a surface of the replica 640d.

The crests 660d of the replica 640d correspond to the grooves 610d of the mold 600d, and the valleys 650d of the replica 640d correspond to the peaks 620d of the mold 600d.

The grooves 610d and peaks 620d of the mold 600d have random meandering-shape as shown in FIG. 20, and so the crests 660d and valleys 650d of the replica 640d also have random meandering-shape.

In each line of prisms, the height (h4) of the replica 640d from bottom to crest 660d is constant, and the distance (d4) of the replica 640d from bottom to valleys 650d changes randomly.

Referring to FIG. 23, observing the crest 660d in one line of replica 640d from the side, the height (L4) of the crest 660d is constant.

Figure 24:
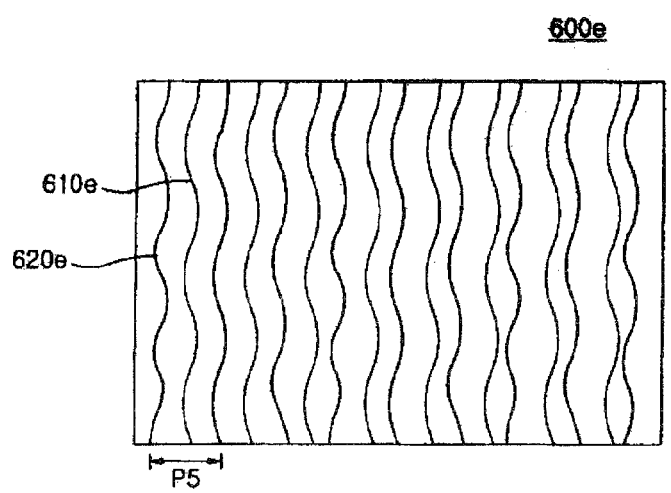
FIG. 24 is a plane view illustrating the mold according to another embodiment of the present invention.

FIG. 24 is a plane view illustrating the mold according to another embodiment of the present invention.

In case the processing device 300 and 500d vibrates periodically in the horizontal and vertical directions, the mold 600e as shown in FIG. 24 is formed.

The grooves 610e of the mold 600e have periodic meandering-shape, and the depth of groove 610e changes periodically.

The peaks 620e of the mold 600e have random meandering-shape, and the height of peak 620e changes randomly. Also, the distance (P5) between peaks 620e changes randomly.

Figure 25:
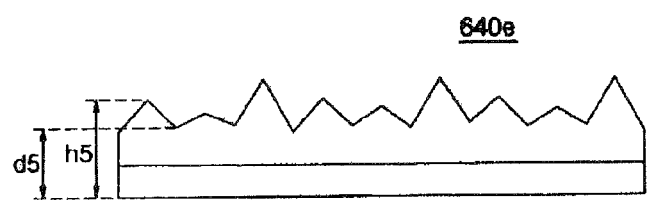
FIG. 25 is a front view illustrating a replica manufactured by the mold in FIG. 24.

FIG. 25 is a front view illustrating a replica manufactured by the mold in FIG. 24.

Figure 26:
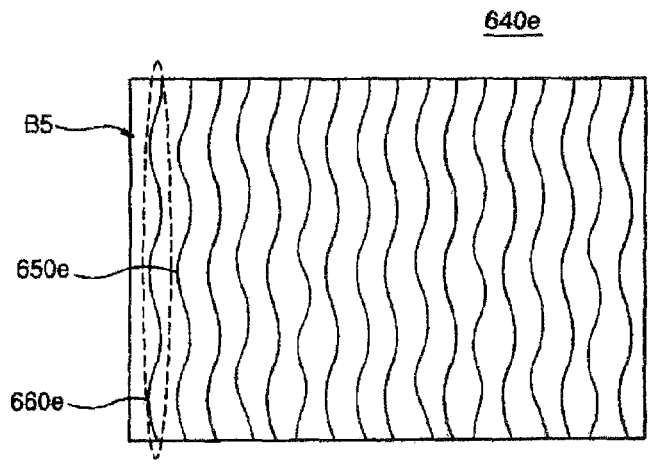
FIG. 26 is a plane view illustrating the replica in FIG. 25.
Figure 27:
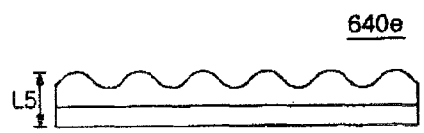
FIG. 27 is a side view illustrating B5 part of FIG. 26.

FIG. 26 is a plane view illustrating the replica in FIG. 25; and FIG. 27 is a side view illustrating B5 part of FIG. 26.

Referring to FIGS. 25 to 27, a plurality of linear crests 660e and valleys 650e are formed on a surface of the replica 640e.

The crests 660e of the replica 640e correspond to the grooves 610e of the mold 600e, and the valleys 650e of the replica 640e correspond to the peaks 620e of the mold 600e.

The grooves 610e of the mold 600e have periodic meandering-shape as shown in FIG. 24, and so the crests 660e of the replica 640e have periodic meandering-shape. And, the peaks 620e of the mold 600e have random meandering-shape, and so the valleys 650e of the replica 640e also have periodic meandering-shape.

In each line of prisms, the height (h5) of the replica 640e from bottom to crest 660e changes randomly, and also the distance (d5) of the replica 640e from bottom to valleys 650e changes randomly.

Referring to FIG. 27, observing the crest 660e in one line of replica 640e from the side, the height (L5) of the crest 660e changes periodically.

Figure 28:
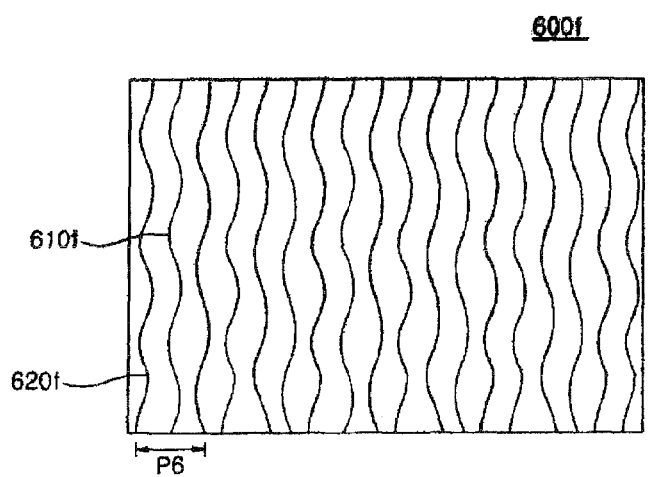
FIG. 28 is a plane view illustrating the mold according to another embodiment of the present invention.

FIG. 28 is a plane view illustrating the mold according to another embodiment of the present invention.

In case the processing device 300 and 500 vibrates randomly in the horizontal and vertical directions, the mold 600f as shown in FIG. 28 is formed.

The grooves 610f and peaks 620f of the mold 600f have periodic meandering-shape, and the height of peak 620f and the depth of grooves 610f changes randomly. Accordingly, the distance (P6) between peaks 620f changes randomly.

Figure 29:
FIG. 29 is a front view illustrating a replica manufactured by the mold in FIG. 28.

FIG. 29 is a front view illustrating a replica manufactured by the mold in FIG. 28.

Figure 30:
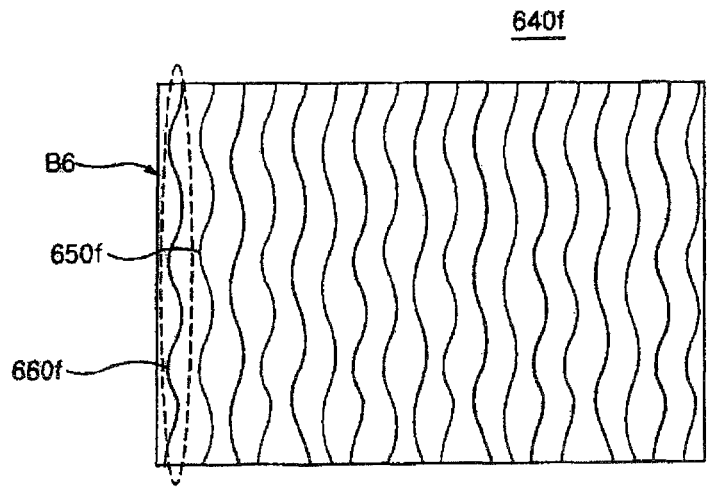
FIG. 30 is a plane view illustrating the replica in FIG. 29.
Figure 31:
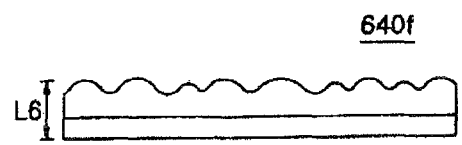
FIG. 31 is a side view illustrating B6 part of FIG. 30.

FIG. 30 is a plane view illustrating the replica in FIG. 29; and FIG. 31 is a side view illustrating B6 part of FIG. 30.

Referring to FIGS. 29 to 31, a plurality of linear crests 660f and valleys 650f are formed on a surface of the replica 640f.

The crests 660f of the replica 640f correspond to the grooves 610f of the mold 600f, and the valleys 650f of the replica 640f correspond to the peaks 620f of the mold 600f.

The grooves 610f and peaks 620f of the mold 600f have random meandering-shape as shown in FIG. 28, and so the crests 660f and valleys 650f of the replica 640f have random meandering-shape.

In each line of prisms, the height (h6) of the replica 640f from bottom to crest 660f changes randomly, and also the distance (d6) of the replica 640f from bottom to valleys 650f changes randomly.

Referring to FIG. 31, observing the crest 660f in one line of replica 640f from the side, the height (L6) of the crest 660f changes randomly.

Figure 32:
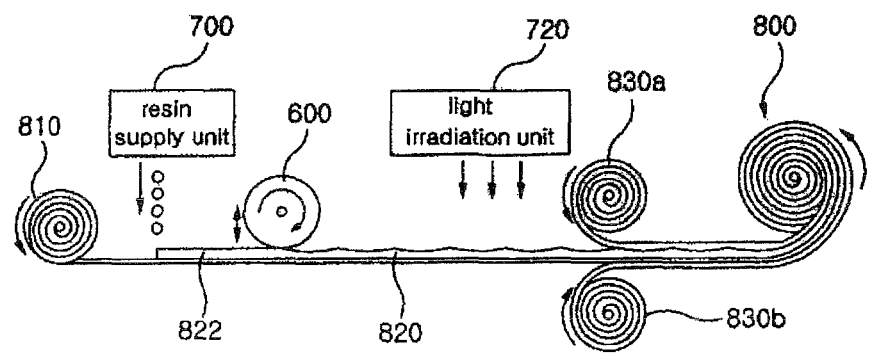
FIG. 32 is a view illustrating a process of manufacturing the prism sheet according to one embodiment of the present invention.

FIG. 32 is a view illustrating a process of manufacturing the prism sheet according to one embodiment of the present invention.

Referring to FIG. 32, a device for manufacturing the prism sheet comprises a resin supply unit 700, a mold 600, and a light irradiation unit 720.

First, as shown in FIG. 32, a base film 810 is supplied successively to the manufacturing device.

The base film 810 is an optical film, and preferably is a thermoplastic polymer film which is transparent and flexible, and has superior processability.

When the base film 810 is supplied to the manufacturing device, the resin supply unit 700 applies a light curative resin 822 onto the base film 810 with a prescribed thickness.

When the resin supply unit 700 applies a certain amount of light curative resin 822 to the base film 810, it is controlled that the light curative resin 822 is applied onto the surface of the base film 810 in a certain thickness.

Then, the base film 810 to which the light curative resin 822 is applied moves to the mold 600.

Then, the mold 600 rotates in a certain direction, and processes the light curative resin 822 applied onto the base film 810. In case the base film 810 to which the light curative resin 822 is applied passes through the mold 600, a pattern corresponding to the pattern of the mold 600 is formed on the surface of the light curative resin 822, and the pattern forms a plurality of prisms 820.

Subsequently, the light curative resin 822 with the pattern of prisms 820 is moved to the light irradiation unit 720.

The light irradiation unit 720 irradiates a light to the light curative resin 822 for a prescribed time. Here, the light, for example UV, may be irradiated onto the light curative resin 822 to cure the prisms 820.

Then, protective films 830a and 830b cover the prism sheet 800 comprising the base film 810 and the prisms 820 above and below the surface of the prism sheet 800, which is then coiled into a roll.

The height of crests of the prism sheet 800 manufactured by the above process changes randomly. Thus, a defect from physical contractions between the prism sheet 800 and other optical films is difficult to be detected visually.

The prism sheet manufactured by the mold of the present invention has random pattern, and so it may reduce or eliminate moiré phenomenon which is occurred by repetition of constant pattern.

FIG. 32 explains the prism sheet as the replica, but the present invention is not limited to the embodiment, and any replica manufactured by the mold of the present invention may be covered by the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A device for processing a mold, comprising:
   a cutter configured to contact a surface of the mold and carve a plurality of peaks and grooves on the surface of the mold, the cutter being made from at least one of carbon steel, high speed steel, hard metal, or ceramics, the cutter having diamond particles that are adhered to a portion contacting the surface of the mold;
   a housing configured to have an area that accommodates the cutter and an aperture through which a portion of the cutter protrudes, wherein the cutter is spaced apart from the aperture by a predetermined distance;
   at least two piezoelectric elements configured to apply a mechanical variation to the cutter, the piezoelectric elements each having a different piezo-electric modulus and each being made from at least one of rochelle salts, barium titanate, or PZT, the at least two piezoelectric elements comprising a first piezoelectric element and a second piezoelectric element; and
   a signal generator configured to apply an electrical signal to induce a vertical displacement of the piezoelectric elements wherein the first piezoelectric element and the second piezoelectric element produce different vertical displacements even though the electrical signal transmitted to the first and second piezoelectric elements is identical,
   wherein the cutter produces a horizontal displacement along with a vertical displacement produced by the different vertical displacements of the first and second piezoelectric elements,
   wherein the peaks and grooves carved by the cutter have a randomly varying shape.

2. The device of claim 1, wherein the distance is in the range of 1 μm to 4 μm.

3. The device of claim 1, wherein the mechanical variation is in an up and down direction, a right and left direction, or an up and down/right and left direction.

4. The device of claim 1, wherein the signal generator applies the same signal to each piezoelectric element.

5. The device of claim 1, wherein the at least two piezoelectric elements comprise exactly two piezoelectric elements positioned to displace the cutter both in a horizontal and a vertical direction simultaneously.

6. The device of claim 1, wherein the piezoelectric elements combine to produce a random horizontal and a random vertical displacement to the cutter.

7. The device of claim 6, wherein the at least two piezoelectric elements comprise exactly two piezoelectric elements positioned to combine to produce a random horizontal and a random vertical displacement to the cutter simultaneously.

8. The device of claim 1, wherein the signal generator applies the same signal to each piezoelectric element and wherein the piezoelectric elements combine to produce a random horizontal and a random vertical displacement to the cutter simultaneously.

* * * * *